United States Patent
Adams et al.

(10) Patent No.: US 8,095,129 B2
(45) Date of Patent: Jan. 10, 2012

(54) SYSTEM AND METHOD FOR OPTIMIZING ROAMING IN A WIRELESS DATA NETWORK

(75) Inventors: Joel Adams, Austin, TX (US); Christian Garvin, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 907 days.

(21) Appl. No.: 11/682,532

(22) Filed: Mar. 6, 2007

(65) Prior Publication Data
US 2008/0219208 A1     Sep. 11, 2008

(51) Int. Cl.
*H04W 4/00* (2009.01)

(52) U.S. Cl. .................. 455/432.1; 455/436; 370/331

(58) Field of Classification Search .......... None
See application file for complete search history.

(56) References Cited

U.S. PATENT DOCUMENTS

| | | | |
|---|---|---|---|
| 5,717,688 A | 2/1998 | Belanger et al. | |
| 5,987,062 A | 11/1999 | Engwer et al. | |
| 6,144,855 A | 11/2000 | Slovin | |
| 7,263,379 B1 * | 8/2007 | Parkulo et al. | 455/521 |
| 2003/0003934 A1 * | 1/2003 | Garces et al. | 455/517 |
| 2003/0227892 A1 | 12/2003 | Cabana | |
| 2004/0203857 A1 * | 10/2004 | Wang | 455/456.1 |
| 2005/0047369 A1 * | 3/2005 | Pecen et al. | 370/331 |
| 2005/0181734 A1 * | 8/2005 | Coutts et al. | 455/67.16 |
| 2007/0019584 A1 * | 1/2007 | Qi et al. | 370/331 |
| 2007/0178911 A1 * | 8/2007 | Baumeister et al. | 455/456.1 |
| 2007/0247366 A1 * | 10/2007 | Smith et al. | 342/464 |
| 2008/0102835 A1 * | 5/2008 | Zhao et al. | 455/436 |
| 2008/0112346 A1 * | 5/2008 | Tolpin et al. | 370/311 |
| 2008/0117875 A1 * | 5/2008 | Bennett et al. | 370/331 |

* cited by examiner

*Primary Examiner* — Erika Gary
(74) *Attorney, Agent, or Firm* — Larson Newman, LLP

(57) ABSTRACT

A system and method for a mobile client device to associate with a preferred access point in a wireless network A determination is made as to whether the mobile client device is stationary within the wireless network The preferred access point is determined between the different access points within the wireless network. The mobile client device associates with the preferred access point to gain desired access to the wireless network

20 Claims, 3 Drawing Sheets

SYSTEM AND METHOD FOR OPTIMIZING ROAMING IN A WIRELESS DATA NETWORK

FIELD OF THE DISCLOSURE

This disclosure relates generally to wireless network systems, and more particularly to wireless roaming optimization based on the hardware state of a mobile client device.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

When moving an active wireless mobile client device from one location to another, the device occasionally needs to switch to a different Access Point (AP) to optimize a connection with a wireless network. This process, known as roam scanning, is normally triggered only when the signal strength of a first AP is very low and if other available APs have a much higher signal strength in comparison to the first AP's signal strength. When the signal strength is low, the throughput is also reduced because the data rate is lowered to maintain connection quality with a lowered signal to noise ratio. If a user moves an active wireless device from one location to another stationary location, there is the likelihood that the AP currently associated with the mobile client device will not be the closest one available. If the current AP associated with the mobile client device is not the closest one available, throughput in the new stationary location may not be as high as if the mobile client device associated with an AP closer to the stationary location. What is more, when that AP reduces its data rate to communicate with the more distant client, the packet air time will be longer than otherwise needed for communication with that client and will reduce the available time for other clients on the same AP to access the wireless network. So, many users on the wireless network may see adverse effects if this client stays in the new location associated to the more distant AP.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings This focus is provided to assist in describing the teachings and should not be interpreted as a limitation on the scope or applicability of the teachings. However, other teachings can certainly be utilized in this application.

Figure 1:
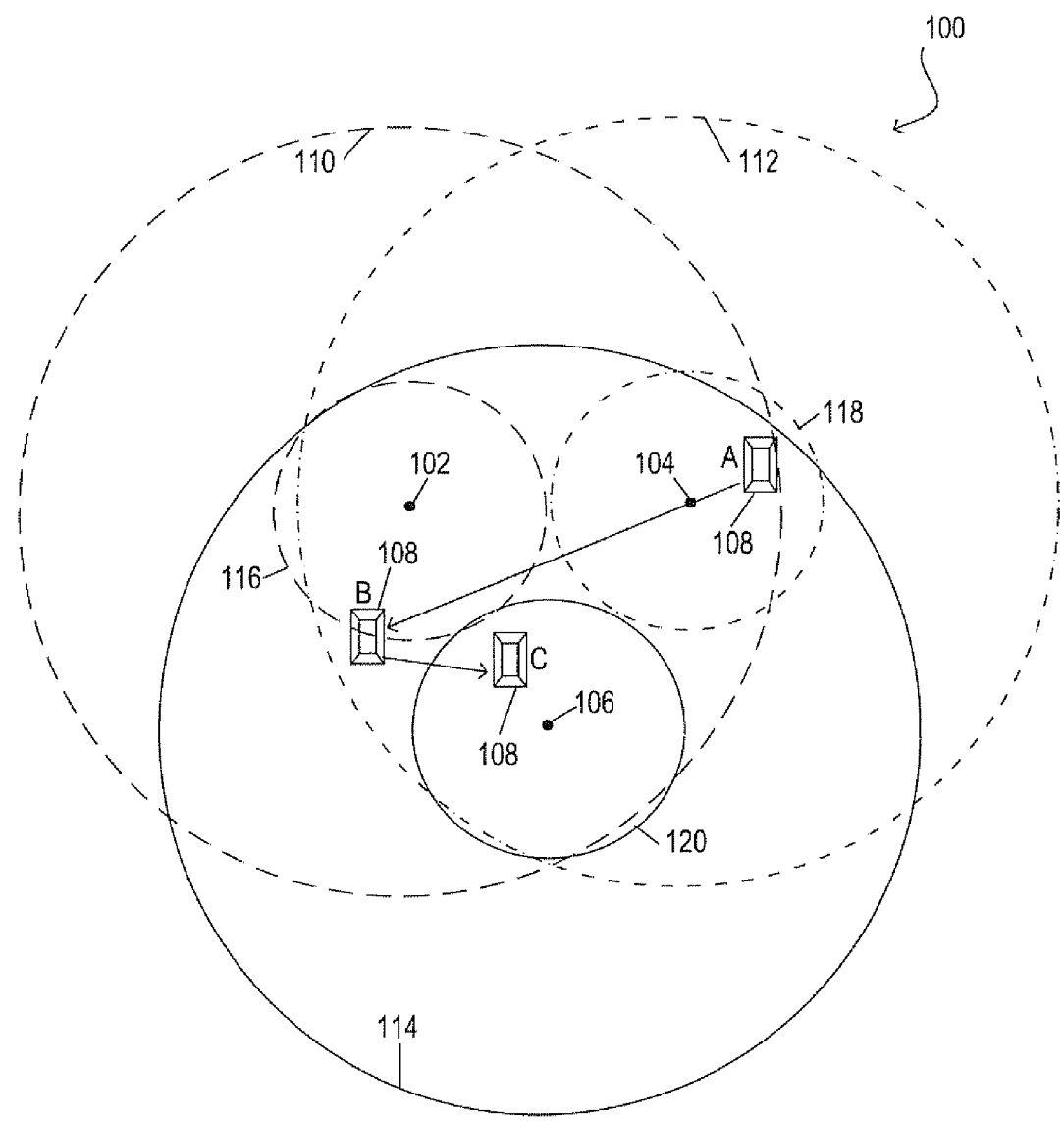
FIG. 1 is a schematic view of an embodiment of a simple wireless network.
Figure 2:
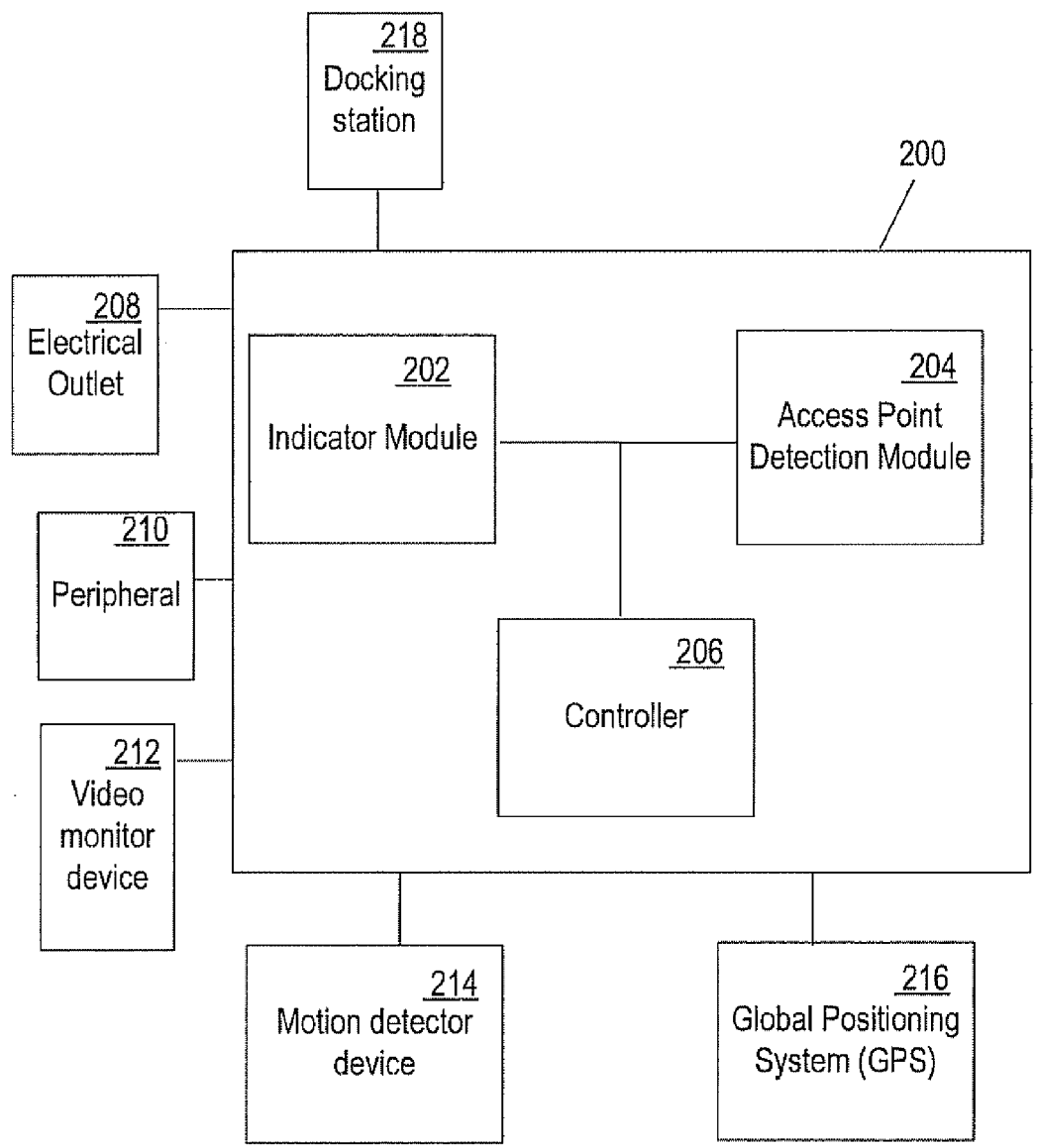
FIG. 2 is a block diagram of an exemplary embodiment of a mobile client device.

FIG. 1 shows an exemplary embodiment of a wireless network 100 comprising a first access point 102, a second access point 104, and a third access point 106. A mobile client device 108 moves throughout the wireless network 100 and gains access to the wireless network by either the first access point 102, the second access point 104 or the third access point 106.

Based on the signal strength of each access point, the mobile client device 108 preferably associates with the access point that has the highest signal strength. When the mobile client device 108 associates with an access point the mobile client device uses that access point to access the wireless network 100. When the mobile client device 108 initially attempts to access the wireless network 100 at position A, the mobile client device performs a roam scan. For example, the mobile device client 108 might measure during the roam scan that the signal strength of the first access point is −80 dBm, the signal strength of the second access point 104 is −50 dBm, and the signal strength of the third access point is −75 dBm. The mobile client device 108 associates with the second access point 104 in position A, because the signal strength of the second access point is the strongest at that particular location.

As the mobile client device 108 is roaming (moving around in the wireless network 100) from position A to position B it continues to associate with the second access point 104 until a signal strength of the second access point is significantly low (no longer in an acceptable range), such as −70 dBm, or the signal strength of either the first access point 102 or the third access point 106 is higher by a certain amount, such as 20 dB more, in comparison to the signal strength of the second access point, The mobile client device 108 performs multiple roam scans as it travels (roams) around the wireless network 100 if the signal strength is below the acceptable threshold. For example, when the mobile client device 108 becomes stationary at position B, the mobile client device determines that the signal strength of the second access point 104 is below an acceptable threshold, such as −70 dBm, and therefore performs a roam scan and determines that the signal strength for the first access point 102 is −60 dBm, the signal strength for the second access point 104 is −80 dBm, and the signal strength for the third access point 106 is −75 dBm. When the mobile client device 108 performs the roam scan while at position B, the mobile client device will then associate with the first access point 102 because the first access point has the best signal strength at position B, and is also 20 db better than the signal strength of the second access point 104.

For example, at position C the signal strength of the first access point 102 is −65 dBm, the signal strength of the second access point 104 is −70 dBm, and the signal strength of the third access point 106 is −50 dBm. Under the typical standards for associating with access points (the standard used while roaming around in the wireless network 100) the mobile client device 108 would not change associations from the first access point 102 to the third access point 106 when stationary at position C, The mobile client device 108 would not re-associate because the signal strength of the first access point 102 is not below −70 dBm and the signal strengths of the second access point 104 and the third access point 106 are not more than 20 dB greater than the signal strength of the first access point. With the mobile client device 108 not associating with the third access point 106, which has the best signal strength, the throughput of the mobile client device is decreased because the signal received by the mobile client device is not as great as possible Also, if there are other clients in the wireless network 100 and they are associated with the first access point 102, their throughput will also be decreased because the mobile client device 108 will take up more throughput capacity than is necessary.

Thus, when the mobile client device 108 is triggered by knowledge that it is stationary at position C, it performs a roam scan to determine the preferred access point During the roam scan the mobile client device 108 determines which access point has the best signal strength and associates with that access point Using the signal strengths for position C stated above the mobile client device 108 associates with the third access point 106, because the signal strength of the third access point is stronger than the signal strength of both the first access point 102 and the second access point 104.

In another embodiment the larger circles 110, 112, and 114 of the first access point 102, the second access point 104, and the third access point 106 represent 8021 1 g or 802.11n access point ranges and the smaller circles 116, 118, and 120 represent 802.11a access point ranges (higher frequency band so less signal propagation). In this embodiment when the mobile client device 108 detects it is stationary at position C it performs a roam scan and selects the best frequency band of the access points in the wireless network 100. While stationary at position C the mobile client device 108 selects the 802.11a band to connect with the wireless network 100, so that the mobile client device has the best data throughput possible at the current location in the wireless network.

In another embodiment the wireless network 100 has multiple sets of access points to allow the best connection possible for the mobile client device 108. In this embodiment there is a first set of access points in hallway areas of a building, such as along the line from position A to position B, and a second set of access points deployed for the purpose of improving a density capability within a classroom or cubicle environment of the building, such as position C. The first set of access points is the combination of the first access point 102 and the second access point 104, and the second set of access points is the third access point 106. The density capability is the ability of an access point within the wireless network 100 to provide a high quality signal to a large number of clients within a small area. In these cases the mobile client device 108, upon determination that mobility has ceased, attempts to switch to the preferred access point for non-mobile use by performing a roam scan.

FIG, 2 shows a block diagram of an exemplary embodiment of a mobile client device 200 comprising an indicator module 202, an access point detection module 204, and a controller 206, such as a wireless controller. In different embodiments the mobile client device 200 is attached to any combination of the following devices an electrical outlet 208, a peripheral 210, an external video monitor device 212, a motion detector device 214, a Global Positioning System (GPS) 216, and a docking station 218. The peripheral 210 can be a Bluetooth mouse, a Universal Serial Bus (USB) mouse or any other type of peripheral that can be attached to the mobile client device 200. The external video monitor 212 can be any video device such as a video projector. The indicator module 202 determines whether the mobile client device 200 is stationary within the wireless network 100 of FIG. 1 using triggers from any of the devices stated above. After determining that the mobile client device 200 is stationary, the indicator module 202 sends a signal to the access point detection module 204 indicating that the mobile client device is stationary Then the access point detection module 204 performs a roam scan to locate all of the available access points in the range of the mobile client device 200. The access point detection module 204 selects the preferred access point from the available access points in the wireless network 100 of FIG. 1 and relays the information about the preferred access point to the controller 206. The controller 206 then associates with the preferred access point selected by the access point detection module 204, and the mobile client device 200 uses the preferred access point to connect with the wireless network 100 of FIG. 1.

The mobile client device 200 may assume that it is stationary upon the occurrence of one or more conditions. For example, the mobile client device 200 may assume that it is stationary when it is plugged in to the electrical outlet 208 for charging or when it is attached to the docking station 218 when it is returned to the 'home base'. Therefore, when a charger from the electrical outlet 208 or when the docking station 218 is attached to the mobile client device 200, logic located in a wireless card or elsewhere can detect this event and initiate a roam scan to associate with the best possible access point. A secondary trigger event is when the peripheral 210, such as a Bluetooth (BT) mouse, a Universal Serial Bus (USB) mouse, or any other pointing device is attached to the mobile client device 200, which indicates that the system has come to rest on a surface Also another trigger event is when the external video monitor device 212, such as a video projector, is attached to the mobile client device 200 An additional indication that the mobile client device 200 is stationary is given by the motion detector device 214 that is attached to the mobile client device. The transition from moving (roaming) for many seconds and then not moving for a few seconds is another use based on the motion sensor signals. Another trigger is to assume if a client is associated to the same access point for many minutes (5-10) after previously roaming from a different access point, then it is no longer moving significantly and should do a roam scan to assure best access point in use. Further, using satellite positioning signals, such as from the Global Positioning System (GPS) 216 using assisted modes with a Wireless Wide Area Network (WWAN), could also be used to determine that the client is no longer moving.

Figure 3:
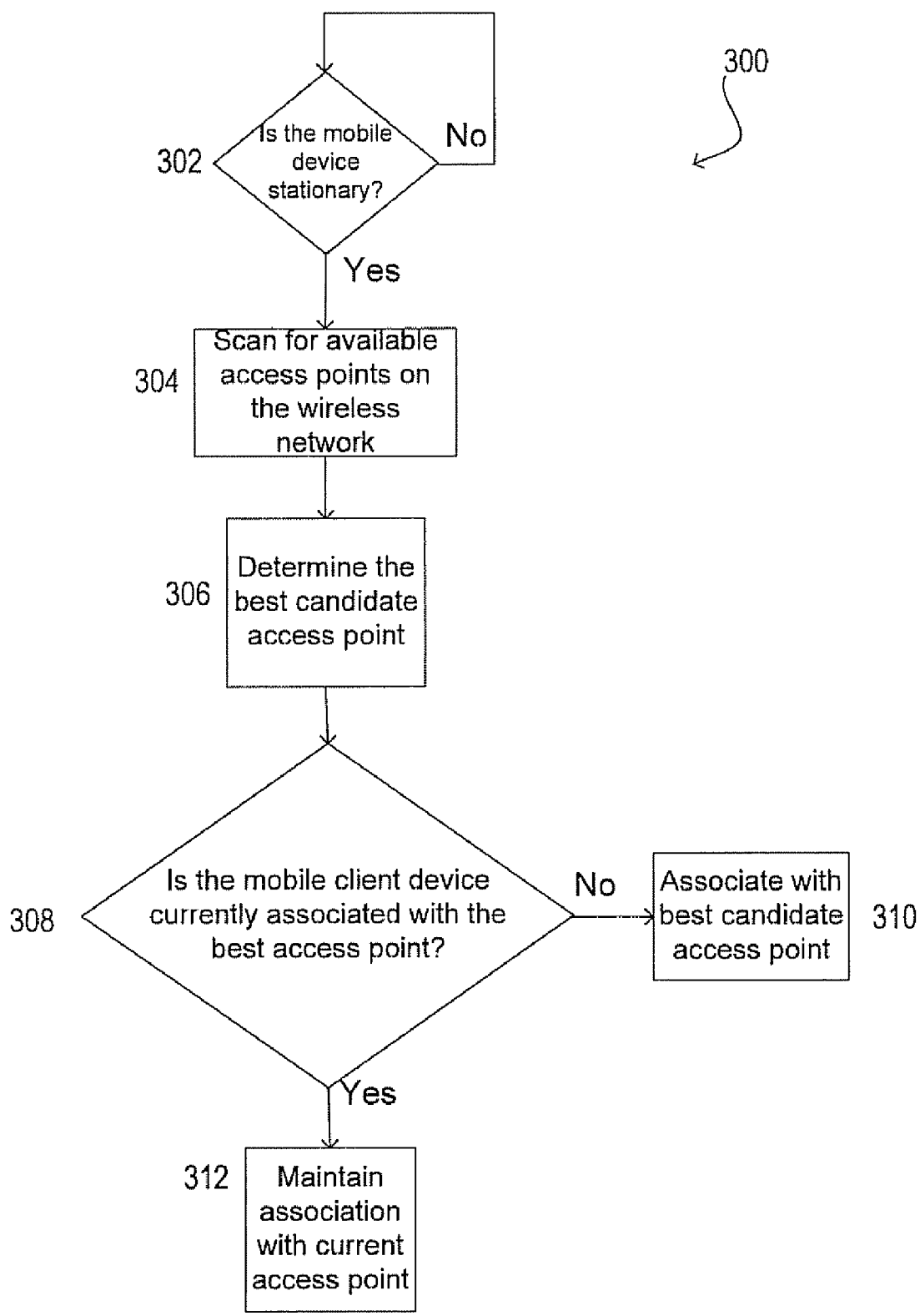
FIG. 3 is a flow chart of an embodiment of a mobile client device performing a roam scan in a wireless network.

FIG. 3 shows a flow chart 300 of an exemplary method to associate the mobile client device 108 with the preferred access point within the wireless network 100. The diagram and example shows a selection based on highest signal strength, but other methods could be used to determine the best candidate access point (Some examples are highest signal strength, highest signal to noise ratio, preferred frequency band, preferred access point type, and highest estimated data rate). In step 302, the mobile client device 108 determines whether it is stationary, which is done by any of the ways stated above. In step 304, the mobile client device performs a roam scan, to scan for and find all of the available access points The mobile client device 108 determines which access point is the best candidate access point in step 306. In step 308, the mobile client device 108 determines whether the best candidate access point is the current access point that the mobile client device is associated with. If the best candidate access point is not the current access point, then the mobile client device associates with the best candidate access point in step 310. However, if the best candidate access point is the current access point, then the mobile client device 108 continues to associate with the current access point in step 312.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims in the claims, means-plus-function clauses are intended to cover the structures described herein as performing the recited function and not only structural equivalents, but also equivalent structures

What is claimed is:

1. A method comprising:
   determining that a mobile client device is stationary;
   determining a preferred access point during a roam scan performed only upon and in response to determining that the mobile client device is stationary; and
   associating the mobile client device with the preferred access point based on the roam scan performed upon and in response to determining that the mobile client device is stationary.

2. The method of claim 1 wherein the determining step comprises determining whether the mobile client device is connected to an electrical outlet.

3. The method of claim 1 wherein the determining step comprises determining whether a peripheral is communicating with the mobile client device.

4. The method of claim 1 wherein the determining step comprises processing motion sensor signals.

5. The method of claim 1 wherein the determining step comprises processing satellite positioning signals.

6. The method of claim 1 wherein the determining step comprises determining whether the mobile client device is connected to an external video monitor device.

7. The method of claim 6 where the external video device is a video projector.

8. The method of claim 1 wherein the determining step comprises determining whether the mobile client device is connected to a docking station.

9. A mobile client device comprising:
   an indicator module adapted to determine whether the mobile client device is stationary;
   an access point detection module adapted to perform a roam scan only upon and in response to receiving a signal from the indicator module indicating that the mobile client device is stationary; and
   a processor coupled to the indicator module, the processor adapted to associate the mobile client device with a first access point based on the roam scan performed in response to the signal indicating that the mobile client device is stationary.

10. The mobile client device of claim 9 wherein a second access point is within the range of the access point detection module.

11. The mobile client device of claim 10 wherein a signal strength of the first access point is within an acceptable range.

12. The mobile client device of claim 11 wherein a signal strength of the second access point is stronger than the signal strength of the first access point.

13. The mobile client device of claim 12 wherein the second access point is a preferred access point.

14. The mobile client device of claim 13 wherein the processor associates with the second access point.

15. A method of roaming a mobile client device in a wireless network, the method comprising:
   accessing a wireless network through a first access point;
   determining that the mobile client device has accessed the wireless network through the first access point for more than a threshold amount of time;
   performing a roam scan to locate a second access point within the wireless network only upon and in response to determining that the mobile client device has accessed the wireless network through the first access point for more than the threshold amount of time;
   determining that the second access point is a preferred access point during the roam scan;
   disconnecting from the first access point in response to the roam scan; and
   connecting to the second access point based on determining that the second access point is the preferred access point during the roam scan performed only upon and in response to determining that the mobile client device has accessed the wireless network through the first access point for more than the threshold amount of time.

16. The method of claim 15 wherein a first set of access points provides the mobile client device with access to the wireless network while roaming.

17. The method of claim 16 wherein a second set of access points provides the mobile client device with access to the wireless network while the mobile client device is stationary.

18. The method of claim 17 wherein the second set of access points improves a density capability in a centralized location.

19. The method of claim 18 wherein a signal strength for the first set of access points is stronger than a signal strength of the second set of access points while the mobile client device is roaming.

20. The method of claim 18 wherein the signal strength for the second set of access points is stronger than the signal strength of the first set of access points while the mobile client device is stationary.

* * * * *